(12) United States Patent
Takahashi et al.

(10) Patent No.: US 12,380,707 B2
(45) Date of Patent: Aug. 5, 2025

(54) IMAGE PROCESSING APPARATUS, IMAGE PROCESSING METHOD, AND NON-TRANSITORY RECORDING MEDIUM

(71) Applicant: SUBARU CORPORATION, Tokyo (JP)

(72) Inventors: Naoki Takahashi, Tokyo (JP); Shuji Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 28 days.

(21) Appl. No.: 18/429,158

(22) Filed: Jan. 31, 2024

(65) Prior Publication Data

US 2024/0273918 A1    Aug. 15, 2024

(30) Foreign Application Priority Data

Feb. 10, 2023    (JP) ................................. 2023-019057

(51) Int. Cl.
*G06V 20/58*    (2022.01)
*G06T 3/40*    (2024.01)
*G06T 7/20*    (2017.01)
*G06V 10/74*    (2022.01)

(52) U.S. Cl.
CPC ............. *G06V 20/584* (2022.01); *G06T 3/40* (2013.01); *G06T 7/20* (2013.01); *G06V 10/761* (2022.01)

(58) Field of Classification Search
CPC .... G06T 7/20; G06T 7/70; G06T 3/40; G06V 20/584; G06V 20/58; G06V 10/761
USPC .................. 348/148, 143; 382/103, 106, 154
See application file for complete search history.

(56) References Cited

U.S. PATENT DOCUMENTS

2018/0319319 A1*  11/2018  Moizumi ............... G06V 20/58
2021/0124966 A1*   4/2021  Blais-Morin ............. G06T 7/70
2021/0209783 A1    7/2021  Yamamoto

FOREIGN PATENT DOCUMENTS

JP    2021-156579 A    10/2021

* cited by examiner

*Primary Examiner* — Sherrie Hsia
(74) *Attorney, Agent, or Firm* — Rimon P.C.

(57) ABSTRACT

An image processing apparatus includes a long-exposure distance image generator, a short-exposure distance image generator, a resolution reducer, a detector, an estimator, and an image processor. The estimator estimates a moving distance of a specific object from a moving amount of the specific object in a pixel region in which saturation has occurred within a long-exposure distance image whose resolution has been reduced. When a difference between the estimated moving distance of the specific object and an actual moving distance of a first vehicle is within a predetermined threshold range, with regard to the pixel region in which the saturation has occurred in the long-exposure distance image, the image processor generates a distance image using distance data of the pixel region in which the saturation has occurred.

8 Claims, 4 Drawing Sheets

IMAGE PROCESSING APPARATUS, IMAGE PROCESSING METHOD, AND NON-TRANSITORY RECORDING MEDIUM

CROSS-REFERENCE TO RELATED APPLICATIONS

The present application claims priority from Japanese Patent Application No. 2023-019057 filed on Feb. 10, 2023, the entire contents of which are hereby incorporated by reference.

BACKGROUND

The disclosure relates to an image processing apparatus, an image processing method, and a non-transitory recording medium.

In recent years, controls have been put into practical use that detect, for example, a vehicle traveling ahead of an own vehicle and avoid contact with a preceding vehicle (contact avoidance control) or keep a safe distance between the preceding vehicle and the own vehicle (adaptive cruise control).

The technique of this kind grasps a vehicle external environment ahead of the own vehicle using, for example, image data obtained by an imaging device and executes an appropriate control.

To execute the above control appropriately, a distance between the own vehicle and, for example, the vehicle ahead of the own vehicle is to be accurately grasped.

For example, a method is known that calculates the distance in accordance with a parallax between an object captured in a right image acquired by a stereo camera and the object captured in a left image acquired by the stereo camera.

To further improve accuracy in measuring the distance, Japanese Unexamined Patent Application Publication (JP-A) No. 2021-156579 discloses an image processing apparatus including: a long-exposure distance image generator that generates a long-exposure distance image; a short-exposure distance image generator that generates a short-exposure distance image; and a distance image generator that generates a distance image by combining the long-exposure distance image and the short-exposure distance image. The long-exposure distance image generator includes a first long-exposure camera and a second long-exposure camera, which are disposed with a predetermined distance therebetween. The long-exposure distance image generator calculates a parallax between a first long-exposure image and a second long-exposure image, which are obtained by capturing an image at long exposure by the first long-exposure camera and the second long-exposure camera. The long-exposure distance image generator generates a long-exposure distance image by calculating the parallax. The short-exposure distance image generator includes a first short-exposure camera and a second short-exposure camera, which are disposed with a predetermined distance therebetween. The short-exposure distance image generator calculates a parallax between a first short-exposure image and a second short-exposure image, which are obtained by capturing an image at short exposure by the first short-exposure camera and the second short-exposure camera. The short-exposure distance image generator generates a short-exposure distance image by calculating the parallax.

SUMMARY

An aspect of the disclosure provides an image processing apparatus including a long-exposure distance image generator, a short-exposure distance image generator, a resolution reducer, a detector, an estimator, and an image processor. The long-exposure distance image generator is configured to calculate a parallax between a first long-exposure image derived from a first long-exposure camera and a second long-exposure image derived from a second long-exposure camera to generate a long-exposure distance image. The first long-exposure camera and the second long-exposure camera are disposed at a predetermined distance from each other and each configured to capture an image at long exposure. The short-exposure distance image generator is configured to calculate a parallax between a first short-exposure image derived from a first short-exposure camera and a second short-exposure image derived from a second short-exposure camera to generate a short-exposure distance image by calculating the parallax. The first short-exposure camera and the second short-exposure camera are disposed at a predetermined distance from each other and each configured to capture an image at short exposure. The resolution reducer is configured to reduce resolution of the long-exposure distance image and the short-exposure distance image by reducing, in the long-exposure distance image and the short-exposure distance image, number of pixels in pixel regions in which a surrounding area is captured that includes an illuminating body of a second vehicle located in front of a first vehicle to which the image processing apparatus is to be applied. The detector is configured to perform a detection of a pixel region in which saturation has occurred among the pixel regions of the long-exposure distance image whose resolution has been reduced. The estimator is configured to estimate, based on a result of the detection performed by the detector, a moving distance of a specific object from a moving amount of the specific object in the pixel region in which the saturation has occurred within the long-exposure distance image whose resolution has been reduced. The image processor is configured to, when a difference between the moving distance of the specific object that has been estimated and an actual moving distance of the first vehicle is within a predetermined threshold range, with regard to the pixel region in which the saturation has occurred in the long-exposure distance image, generate a distance image using distance data of the pixel region in which the saturation has occurred.

An aspect of the disclosure provides an image processing method in an image processing apparatus including a long-exposure distance image generator, a short-exposure distance image generator, a resolution reducer, a detector, an estimator, and an image processor. The image processing method includes: generating, with the long-exposure distance image generator, a long-exposure distance image by calculating a parallax between a first long-exposure image derived from a first long-exposure camera and a second long-exposure image derived from a second long-exposure camera, the first long-exposure camera and the second long-exposure camera being disposed at a predetermined distance from each other and each configured to capture an image at long exposure; generating, with the short-exposure distance image generator, a short-exposure distance image by calculating a parallax between a first short-exposure image derived from a first short-exposure camera and a second short-exposure image derived from a second short-exposure camera, the first short-exposure camera and the second short-exposure camera being disposed at a predetermined distance from each other and each configured to capture an image at short exposure; reducing resolution of the long-exposure distance image and the short-exposure distance image, with the resolution reducer, by reducing, in the long-exposure distance image and the short-exposure distance image, number of pixels in pixel regions in which a surrounding area is captured that includes an illuminating body of a second vehicle located in front of a first vehicle to which the image processing apparatus is to be applied; performing, with the detector, a detection of a pixel region in which saturation has occurred among the pixel regions of the long-exposure distance image whose resolution has been reduced; estimating, with the estimator, based on a result of the detection performed by the detector, a moving distance of a specific object from a moving amount of the specific object in the pixel region in which the saturation has occurred within the long-exposure distance image whose resolution has been reduced; and generating, with the image processor, when a difference between the moving distance of the specific object that has been estimated and an actual moving distance of the first vehicle is within a predetermined threshold range, with regard to the pixel region in which the saturation has occurred in the long-exposure distance image, a distance image using distance data of the pixel region in which the saturation has occurred.

An aspect of the disclosure provides a non-transitory computer readable recording medium containing a program to be applied to an image processing apparatus including a long-exposure distance image generator, a short-exposure distance image generator, a resolution reducer, a detector, an estimator, and an image processor. The program causes, when executed by a computer, the computer to implement an image processing method. The image processing method includes: generating, with the long-exposure distance image generator, a long-exposure distance image by calculating a parallax between a first long-exposure image derived from a first long-exposure camera and a second long-exposure image derived from a second long-exposure camera, the first long-exposure camera and the second long-exposure camera being disposed at a predetermined distance from each other and each configured to capture an image at long exposure; generating, with the short-exposure distance image generator, a short-exposure distance image by calculating a parallax between a first short-exposure image derived from a first short-exposure camera and a second short-exposure image derived from a second short-exposure camera, the first short-exposure camera and the second short-exposure camera being disposed at a predetermined distance from each other and each configured to capture an image at short exposure; reducing resolution of the long-exposure distance image and the short-exposure distance image, with the resolution reducer, by reducing, in the long-exposure distance image and the short-exposure distance image, number of pixels in pixel regions in which a surrounding area is captured that includes an illuminating body of a second vehicle located in front of a first vehicle to which the image processing apparatus is to be applied; performing, with the detector, a detection of a pixel region in which saturation has occurred among the pixel regions of the long-exposure distance image whose resolution has been reduced; estimating, with the estimator, based on a result of the detection performed by the detector, a moving distance of a specific object from a moving amount of the specific object in the pixel region in which the saturation has occurred within the long-exposure distance image whose resolution has been reduced; and generating, with the image processor, when a difference between the moving distance of the specific object that has been estimated and an actual moving distance of the first vehicle is within a predetermined threshold range, with regard to the pixel region in which the saturation has occurred in the long-exposure distance image, a distance image using distance data of the pixel region in which the saturation has occurred.

An aspect of the disclosure provides an image processing apparatus including one or more processors and one or more memories communicably coupled to the one or more processors. The one or more processors are configured to generate a long-exposure distance image by calculating a parallax between a first long-exposure image derived from a first long-exposure camera and a second long-exposure image derived from a second long-exposure camera, the first long-exposure camera and the second long-exposure camera being disposed at a predetermined distance from each other and each configured to capture an image at long exposure; generate a short-exposure distance image by calculating a parallax between a first short-exposure image derived from a first short-exposure camera and a second short-exposure image derived from a second short-exposure camera, the first short-exposure camera and the second short-exposure camera being disposed at a predetermined distance from each other and each configured to capture an image at short exposure; reduce resolution of the long-exposure distance image and the short-exposure distance image by reducing, in the long-exposure distance image and the short-exposure distance image, number of pixels in pixel regions in which a surrounding area is captured that includes an illuminating body of a second vehicle located in front of a first vehicle to which the image processing apparatus is to be applied; perform a detection of a pixel region in which saturation has occurred among the pixel regions of the long-exposure distance image whose resolution has been reduced; estimate, based on a result of the detection performed by the detector, a moving distance of a specific object from a moving amount of the specific object in the pixel region in which the saturation has occurred within the long-exposure distance image whose resolution has been reduced; and generate, when a difference between the moving distance of the specific object that has been estimated and an actual moving distance of the first vehicle is within a predetermined threshold range, with regard to the pixel region in which the saturation has occurred in the long-exposure distance image, a distance image using distance data of the pixel region in which the saturation has occurred.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A technique disclosed in JP-A No. 2021-156579 generates a mask image by calculating in a pixel unit. For example, when irregular reflection (glare) occurs over pixels, an error may possibly occur in a distance at a position of the glare. The erroneous distance may be referred to as a ghost distance.

It is desirable to provide an image processing apparatus, an image processing method, and a non-transitory recording medium that suppress occurrence of a ghost distance due to lens glare and obtain effective distance data.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

An image processing apparatus 1 according to an example embodiment of the disclosure will be described with reference to FIGS. 1 to 4.

<Image Processing Apparatus 1>

Figure 1:
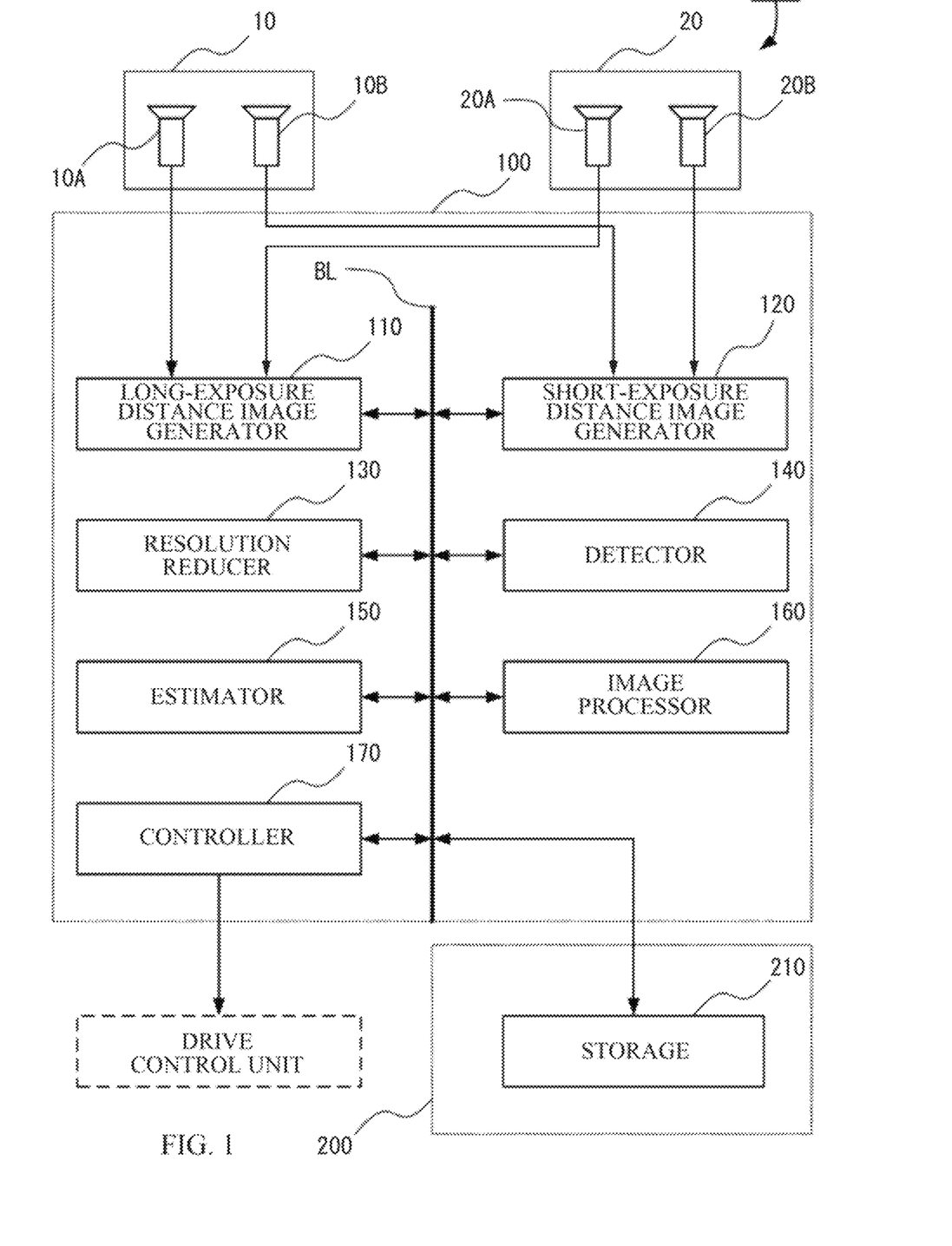
FIG. 1 is a diagram illustrating a configuration of an image processing apparatus according to one example embodiment of the disclosure.

The image processing apparatus 1 according to the example embodiment may include a processor 100 and a memory 200 as illustrated in FIG. 1.

The processor 100 may execute various kinds of image processing.

In the example embodiment, the processor 100 executes image processing including, for example, a long-exposure distance image generation process, a short-exposure distance image generation process, an image resolution reducing process, a saturation region detection process of detecting saturation in a low-resolution image, a specific object's moving distance estimation process, and a distance image generation process.

Note that details of each of the processes will be described later.

The memory 200 may include, for example, a read-only memory (ROM) or a random-access memory (RAM). The memory 200 may save and store programs and various pieces of data.

In the example embodiment, the memory 200 may include a storage 210. The storage 210 may save and store, for example, control programs and generated image data.

An imaging device that is to supply images to the image processing apparatus 1 according to the example embodiment may include an imaging device 10 and an imaging device 20 as illustrated in FIG. 1.

The imaging device 10 and the imaging device 20 may be, for example, cameras disposed on an upper part of a windshield inside an own vehicle with a predetermined distance between the imaging device 10 and the imaging device 20 in a vehicle width direction. In one embodiment, the own vehicle may serve as a "first vehicle".

The imaging device 10 and the imaging device 20 may configure a stereo camera. The image processing apparatus 1 may measure a distance using a parallax between an image captured by the imaging device 10 and an image captured by the imaging device 20 and generate a distance image.

As used herein, the term "distance image" refers to, for example, an image that is colored in accordance with the distance. The distance in the distance image may indicate a distance from the imaging devices 10 and 20 to a specific object that is an object to be measured.

The imaging device 10 may include a long-exposure camera 10A and a short-exposure camera 10B. The imaging device 20 may include a long-exposure camera 20A and a short-exposure camera 20B.

The long-exposure cameras 10A and 20A may capture an image at an exposure time longer than an exposure time of the short-exposure cameras 10B and 20B.

Figure 2A:
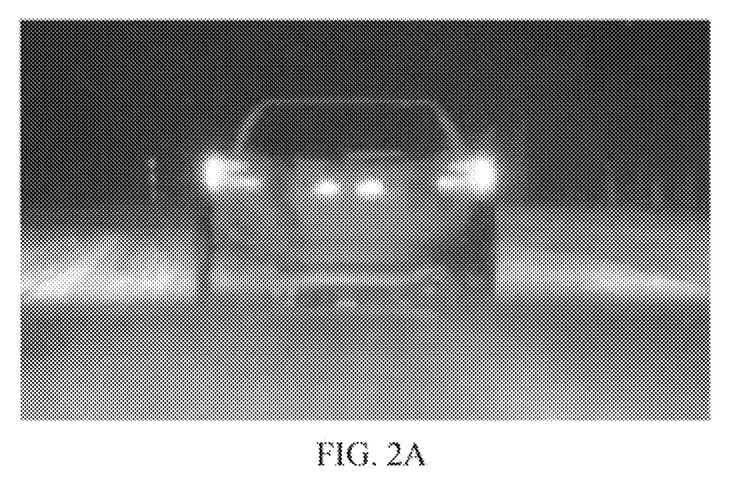
FIG. 2A is an image illustrating an example of an image obtained when a vehicle in front is captured at long exposure according to one example embodiment.
Figure 2B:
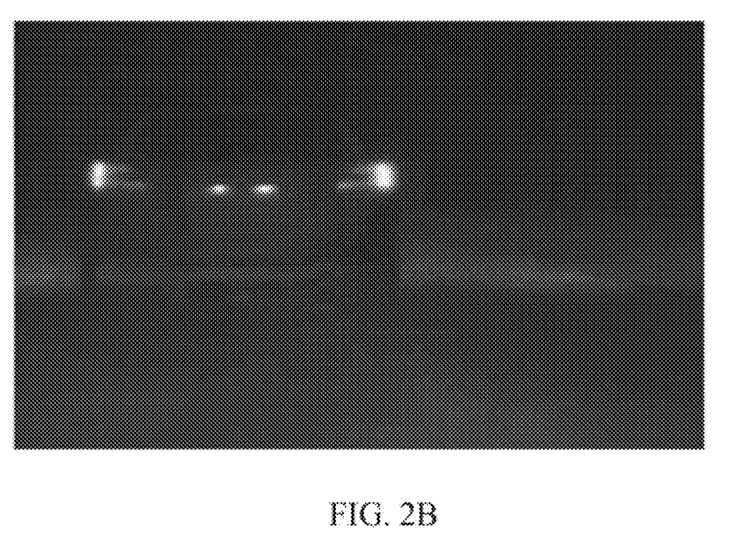
FIG. 2B is an image illustrating an example of an image obtained when the vehicle in front is captured at short exposure according to one example embodiment.

A long-exposure image captured by the long-exposure cameras 10A and 20A may be, for example, an image as illustrated in FIG. 2A. A short-exposure image captured by the short-exposure cameras 10B and 20B may be, for example, an image as illustrated in FIG. 2B.

The long-exposure image captured by the long-exposure cameras 10A and 20A may be, for example, an image in which saturation caused by an illuminating body on a rear part of a vehicle in front of the own vehicle is viewable in a wide range as illustrated in FIG. 2A. The short-exposure image captured by the short-exposure cameras 10B and 20B may be, for example, an image in which saturation caused by the illuminating body on the rear part of the vehicle in front is viewable in a narrow range as illustrated in FIG. 2B. In one embodiment, the vehicle in front may serve as a "second vehicle" located ahead of the first vehicle serving as the own vehicle.

<Configuration of Processor 100>

As illustrated in FIG. 1, the processor 100 of the image processing apparatus 1 according to the example embodiment includes a long-exposure distance image generator 110, a short-exposure distance image generator 120, a resolution reducer 130, a detector 140, an estimator 150, an image processor 160, and a controller 170.

The long-exposure distance image generator 110 calculates a parallax between a first long-exposure image derived from the long-exposure camera 10A and a second long-exposure image derived from the long-exposure camera 20A. The long-exposure camera 10A and the long-exposure camera 20A are disposed at a predetermined distance from each other and each capture an image at long exposure. The long-exposure distance image generator 110 generates a long-exposure distance image by calculating the parallax. In one embodiment, the long-exposure distance image generator 110 may serve as a "long-exposure distance image generator". "In one embodiment, the long-exposure camera 10A may serve as a "first long-exposure camera". In one embodiment, the long-exposure camera 20A may serve as a "second long-exposure camera".

The long-exposure distance image generated by the long-exposure distance image generator 110 may be outputted to the controller 170, which will be described later, via a bus line BL. The controller 170 may temporarily save the received long-exposure distance image in the storage 210.

The short-exposure distance image generator 120 calculates a parallax between a first short-exposure image derived from the short-exposure camera 10B and a second short-exposure image derived from the short-exposure camera 20B. The short-exposure camera 10B and the short-exposure camera 20B are disposed at a predetermined distance from each other and each capture an image at short exposure. The short-exposure distance image generator 120 generates a short-exposure distance image by calculating the parallax. In one embodiment, the short-exposure distance image generator 120 may serve as a "short-exposure distance image generator". In one embodiment, the short-exposure camera 10B may serve as a "first short-exposure camera". In one embodiment, the short-exposure image 20B may serve as a "second short-exposure camera".

The short-exposure distance image generated by the short-exposure distance image generator 120 may be outputted to the controller 170, which will be described later, via the bus line BL. The controller 170 may temporarily save the received short-exposure distance image in the storage 210.

The resolution reducer 130 reduces resolution of the long-exposure distance image and the short-exposure distance image by reducing, in the long-exposure distance image and the short-exposure distance image, the number of pixels in pixel regions in which a surrounding area is captured that includes the illuminating body of the vehicle in front. In one embodiment, the resolution reducer 130 may serve as a "resolution reducer".

Figure 3A:
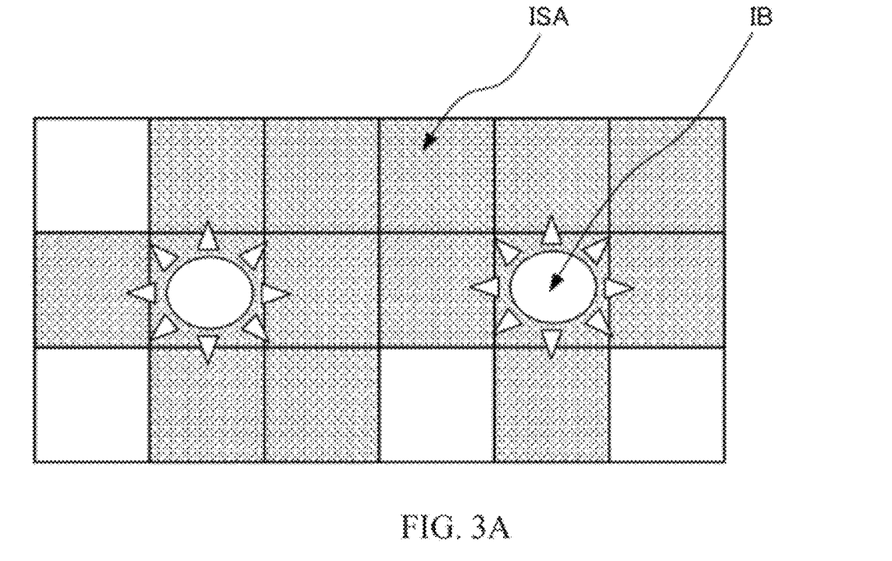
FIG. 3A is a schematic diagram illustrating the image of FIG. 2A whose resolution has been reduced according to one example embodiment.
Figure 3B:
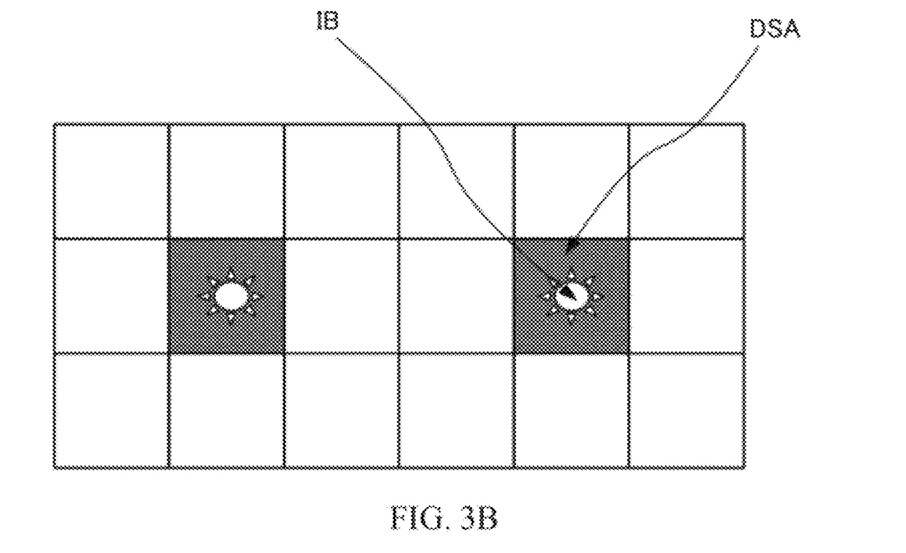
FIG. 3B is a schematic diagram illustrating the image of FIG. 2B whose resolution has been reduced according to one example embodiment.

FIGS. 3A and 3B schematically illustrate images of the long-exposure distance image and the short-exposure distance image whose resolution has been reduced. For example, pixel regions of 600 pixels×300 pixels with an illuminating body IB of the vehicle in front located at a center may be compressed to pixel regions of 6 pixels×3 pixels.

In FIG. 3A, pixel regions ISA with light shading may be pixel regions in which saturation of the illuminating body IB is observed in the long-exposure distance image whose resolution has been reduced.

In FIG. 3B, pixel regions DSA with dark shading may be pixel regions in which saturation of the illuminating body IB is observed in the short-exposure distance image whose resolution has been reduced.

The image generated by the resolution reducer 130 may be outputted to the controller 170, which will be described later, via the bus line BL. The controller 170 may temporarily save, in the storage 210, the generated image that has been received.

Note that a method of reducing the resolution may include, for example, a method of employing a maximum brightness pixel and a method of smoothing. The method may be a combination of these methods or any other method.

The detector 140 performs a detection of pixel regions in which saturation has occurred among the pixel regions of the long-exposure distance image whose resolution has been reduced. In one embodiment, the detector 140 may serve as a "detector".

In the example of FIG. 3A, the detector 140 may detect, for example, the pixel regions ISA with light shading in the long-exposure distance image whose resolution has been reduced.

The data of the pixel regions ISA detected by the detector 140 may be outputted to the controller 170, which will be described later, via the bus line BL. The controller 170 may temporarily save, in the storage 210, the data of the pixel regions ISA that has been received.

The estimator 150 estimates, based on a result of the detection performed by the detector 140, a moving distance of the specific object from a moving amount of the specific object in the pixel regions ISA in which the saturation has occurred within the long-exposure distance image whose resolution has been reduced. In one embodiment, the estimator 150 may serve as an "estimator". In one embodiment, the pixel regions ISA may serve as a "pixel region".

The moving distance data of the specific object estimated by the estimator 150 may be outputted to the controller 170, which will be described later, via the bus line BL. The controller 170 may temporarily save, in the storage 210, the estimated moving distance data of the specific object that has been received.

When a difference between the moving distance of the specific object estimated by the estimator 150 and an actual moving distance of the own vehicle is within a predetermined threshold range, with regard to the pixel regions ISA in which the saturation has occurred in the long-exposure distance image, the image processor 160 generates a distance image using the distance data of the pixel regions ISA in which the saturation has occurred. In one embodiment, the image processor 160 may serve as an "image processor".

As used herein, the term "predetermined threshold range" may refer to, for example, a case where the difference between the estimated moving distance of the specific object and the actual moving distance of the own vehicle is ±1 meter taking into consideration the kind of the object that is expected to be an object to be controlled and other disturbances.

In some embodiments, with regard to overlapping regions between the pixel regions ISA in which the saturation has occurred in the long-exposure distance image and the pixel regions DSA in which the illuminating body IB of the vehicle in front has been captured in the short-exposure distance image, the image processor 160 may generate the distance image using the distance data of the pixel regions DSA in which the illuminating body IB of the vehicle in front has been captured in the short-exposure distance image. In one embodiment, the pixel regions DSA may serve as the "pixel region".

In some embodiments, with regard to pixel regions other than the pixel regions ISA in which the saturation has occurred in the long-exposure distance image, the image processor 160 may generate the distance image using the distance data of the long-exposure distance image or the short-exposure distance image.

In some embodiments, the image processor 160 may change the predetermined threshold range and the number of pixels to be reduced in accordance with a weather state.

In some embodiments, when the long-exposure distance image or the short-exposure distance image includes reflection of light caused by an illuminating body IB of an oncoming vehicle or an illuminating body IB around a road, the image processor 160 may generate the distance image using the long-exposure distance image or the short-exposure distance image including the saturation and excluding the reflection of the light. In one embodiment, the oncoming vehicle may serve as a "third vehicle" that travels in an opposite direction to a direction in which the first vehicle serving as the own vehicle travels.

The controller 170 may control the operation of the entire image processing apparatus 1 based on control programs stored in a non-illustrated random-access memory (ROM).

In the example embodiment, the controller 170 executes an image processing control including, for example, the long-exposure distance image generation process executed by the long-exposure distance image generator 110, the short-exposure distance image generation process executed by the short-exposure distance image generator 120, the image resolution reducing process executed by the resolution reducer 130, the saturation region detection process of detecting saturation in the low-resolution image executed by the detector 140, the specific object's moving distance estimation process executed by the estimator 150, and the distance image generation process executed by the image processor 160.

<Processes Performed by Image Processing Apparatus 1>

Figure 4:
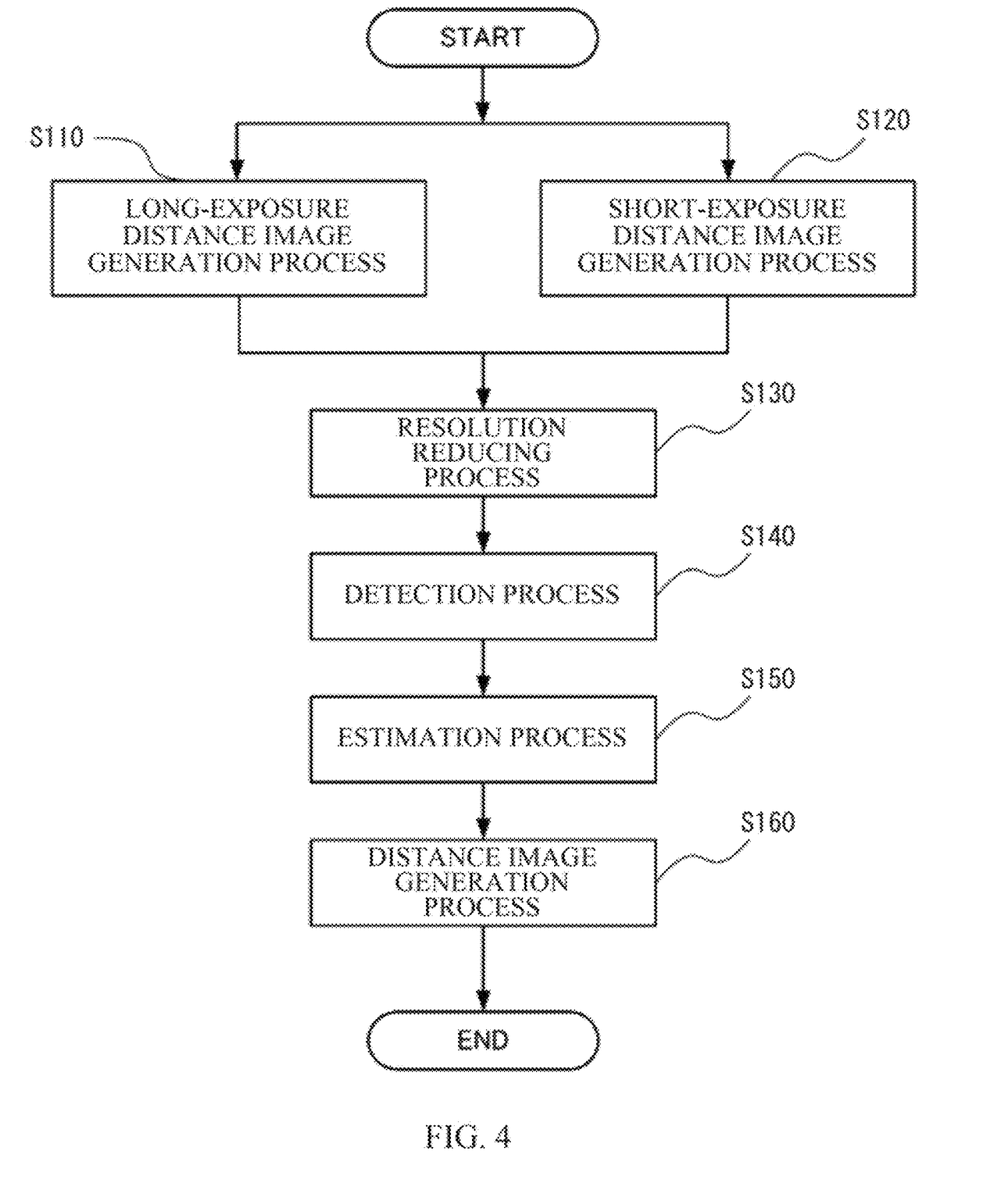
FIG. 4 is a flowchart illustrating a process performed by the image processing apparatus illustrated in FIG. 1.

The processes performed by the image processing apparatus 1 according to the example embodiment will be described with reference to FIG. 4.

The controller 170 may control the long-exposure distance image generator 110 to execute the long-exposure distance image generation process to generate the long-exposure distance image (step S110).

The long-exposure distance image generated by the long-exposure distance image generator 110 may be outputted to the controller 170 via the bus line BL. The controller 170 may temporarily save the received long-exposure distance image in the storage 210.

The controller 170 may control the short-exposure distance image generator 120 to execute the short-exposure distance image generation process to generate the short-exposure distance image (step S120).

The short-exposure distance image generated by the short-exposure distance image generator 120 may be outputted to the controller 170 via the bus line BL. The controller 170 may temporarily save the received short-exposure distance image in the storage 210.

Note that steps S110 and S120 may be executed simultaneously.

The controller 170 may read the long-exposure distance image generated by the long-exposure distance image generator 110 and the short-exposure distance image generated by the short-exposure distance image generator 120 from the storage 210 and output the long-exposure distance image and the short-exposure distance image to the resolution reducer 130. The controller 170 may control the resolution reducer 130 to execute the resolution reducing process of reducing the resolution of the long-exposure distance image and the short-exposure distance image (step S130).

The images generated by the resolution reducer 130 may be outputted to the controller 170 via the bus line BL. The controller 170 may temporarily save, in the storage 210, the received images whose resolution has been reduced.

The controller 170 may read the long-exposure distance image whose resolution has been reduced by the resolution reducer 130 from the storage 210 and output the long-exposure distance image whose resolution has been reduced to the detector 140. The controller 170 may control the detector 140 to execute the detection process of detecting the pixel regions ISA in which saturation has occurred in the pixel regions of the long-exposure distance image whose resolution has been reduced (step S140).

The data of the pixel regions ISA detected by the detector 140 may be outputted to the controller 170 via the bus line BL. The controller 170 may temporarily save, in the storage 210, the data of the pixel regions ISA that has been received.

The controller 170 may read the data of the pixel regions ISA detected by the detector 140 from the storage 210 and output the read data to the estimator 150. The controller 170 may control the estimator 150 to execute the moving distance estimation process of estimating the moving distance of the specific object. The moving distance of the specific object may be estimated, based on the data of the pixel regions ISA that has been detected, from the moving amount of the specific object in the pixel regions ISA in which the saturation has occurred within the long-exposure distance image whose resolution has been reduced (step S150).

The moving distance data of the specific object estimated by the estimator 150 may be outputted to the controller 170 via the bus line BL. The controller 170 may temporarily save, in the storage 210, the estimated moving distance data of the specific object that has been received.

The controller 170 may read the long-exposure distance image generated by the long-exposure distance image generator 110, the short-exposure distance image generated by the short-exposure distance image generator 120, and the moving distance data of the specific object that has been estimated by the estimator 150 from the storage 210. If the difference between the estimated moving distance of the specific object and the actual moving distance of the own vehicle is within the predetermined threshold range, with regard to the pixel regions ISA in which the saturation has occurred in the long-exposure distance image, the controller 170 may control the image processor 160 to execute the distance image generation process of generating the distance image using the distance data of the pixel regions ISA in which the saturation has occurred. The controller 170 may output a processing result of the image processor 160 to a drive control unit and end all the processes (step S160).

Workings and Example Effects

As described above, the image processing apparatus 1 of the example embodiment includes the resolution reducer 130, which reduces the number of pixels in pixel regions in which a surrounding area including the illuminating body IB of the vehicle in front is captured in the long-exposure distance image and the short-exposure distance image to reduce the resolution of the long-exposure distance image and the short-exposure distance image.

The distance image in which the illuminating body IB of the vehicle in front is captured may include an image of saturation and an image of light expansion that is not caused by saturation.

If a distance is calculated from the distance image including the image of expanded light, a ghost distance occurs.

In the long-exposure distance image and the short-exposure distance image, when the number of pixels is reduced in the pixel regions, in which the surrounding area including the illuminating body IB of the vehicle in front is captured, to reduce the resolution of the long-exposure distance image and the short-exposure distance image, it is possible to enlarge the pixel that has captured the expanded light and determine whether saturation has occurred.

Reducing the resolution of the distance image helps to accurately determine whether saturation has occurred and suppress occurrence of the ghost distance.

Additionally, the image processing apparatus 1 of the example embodiment includes the detector 140, which detects the pixel regions ISA in which saturation has occurred among the pixel regions of the long-exposure distance image whose resolution has been reduced.

Thus, the pixel regions of the long-exposure distance image whose resolution has been reduced may be clearly classified into the pixel regions ISA in which saturation has occurred and the pixel regions in which saturation has not occurred. This helps to accurately detect the pixel regions ISA in which saturation has occurred.

Additionally, the image processing apparatus 1 of the example embodiment includes the image processor 160. If the difference between the estimated moving distance of the specific object and the actual moving distance of the own vehicle is within the predetermined threshold range, with regard to the pixel regions ISA in which the saturation has occurred in the long-exposure distance image, the image processor 160 generates the distance image using the distance data of the pixel regions ISA in which the saturation has occurred.

As used herein, the term "estimated moving distance of the specific object" may refer to the moving distance of the specific object estimated from the moving amount of the specific object in the pixel regions ISA in which the saturation has occurred within the long-exposure distance image whose resolution has been reduced.

In other words, when the difference between the estimated moving distance of the specific object and the actual moving distance of the own vehicle is great, a degree of influence that the saturation has on the calculation of the distance is great.

When the difference between the estimated moving distance of the specific object and the actual moving distance of the own vehicle is within the predetermined threshold range, in other words, when the degree of influence that the saturation has on the calculation of the distance is small, using the distance data of the pixel regions ISA in which the saturation has occurred in generating the distance image does not reduce reliability. In this case, the distance image is generated using the distance data of the pixel regions ISA in which the saturation has occurred.

This helps to obtain desired distance data even in a situation in which saturation has occurred.

Furthermore, the predetermined threshold range may be set to avoid contact with an object located ahead in a traveling path on which the own vehicle travels. For example, the object located ahead may include the vehicle in front including the illuminating body IB and a pedestrian or an animal captured by reflection of surrounding light.

The amount of data regarding the distance obtainable from, for example, the pedestrian or the animal captured by the reflection of the surrounding light is small.

When the difference between the estimated moving distance of the specific object and the actual moving distance of the own vehicle is within the predetermined threshold range, the distance image is generated using the distance data of the pixel regions ISA in which the saturation has occurred. This helps to avoid contact with the object located ahead in the traveling path on which the own vehicle travels.

The image processing apparatus 1 of the example embodiment helps to suppress occurrence of the ghost distance due to lens glare and obtain effective distance data.

In some embodiments, with regard to overlapping regions between the pixel regions ISA in which the saturation has occurred in the long-exposure distance image and the pixel regions DSA in which the illuminating body IB of the vehicle in front has been captured in the short-exposure distance image, the image processor 160 of the image processing apparatus 1 may generate the distance image using the distance data of the pixel regions in which the illuminating body IB of the vehicle in front has been captured in the short-exposure distance image.

The overlapping regions between the pixel regions ISA in which the saturation has occurred in the long-exposure distance image and the pixel regions DSA in which the illuminating body IB of the vehicle in front has been captured in the short-exposure distance image are regions where the saturation is strong.

For this reason, with regard to the overlapping regions between the pixel regions ISA in which the saturation has occurred in the long-exposure distance image and the pixel regions DSA in which the illuminating body IB of the vehicle in front has been captured in the short-exposure distance image, the image processor 160 may generate the distance image using the distance data of the pixel regions DSA in which the illuminating body IB of the vehicle in front has been captured in the short-exposure distance image with small lens glare.

The image processing apparatus 1 of the example embodiment helps to suppress occurrence of the ghost distance due to lens glare and obtain effective distance data.

In some embodiments, with regard to the pixel regions other than the pixel regions ISA in which the saturation has occurred in the long-exposure distance image, the image processor 160 of the image processing apparatus 1 may generate the distance image using the distance data of the long-exposure distance image or the short-exposure distance image.

In other words, with regard to the pixel regions other than the pixel regions ISA in which the saturation has occurred in the long-exposure distance image, the image processor 160 may generate the distance image using the distance data of the long-exposure distance image having high resolution or the short-exposure distance image having high resolution.

Note that, in one example, whether to use the distance data of the long-exposure distance image or the distance data of the short-exposure distance image may be determined in accordance with a gradient or a degree of saturation in the pixel regions caused by another illuminating body IB.

In some embodiments, the image processor 160 of the image processing apparatus 1 may change the predetermined threshold range and the number of pixels to be reduced in accordance with the weather state.

In other words, when the weather state is, for example, a rainy weather or a snowy weather, a quality of image of the long-exposure distance image or the short-exposure distance image may possibly be reduced due to rain water or snow that adheres to an external surface of the windshield. In this case, the saturation caused by the illuminating body IB may possibly be captured in a state enlarged from the actual size.

For this reason, for example, the predetermined threshold range may be adjusted when the weather state is the rainy weather or the snowy weather.

The image processing apparatus 1 of the example embodiment helps to suppress occurrence of the ghost distance due to lens glare despite any disturbance and obtain effective distance data.

In some embodiments, when the long-exposure distance image or the short-exposure distance image includes reflection of light caused by the illuminating body IB of the oncoming vehicle or the illuminating body IB around the road, the image processor 160 of the image processing apparatus 1 may generate the distance image using the long-exposure distance image or the short-exposure distance image excluding the reflection of the light caused by the illuminating body IB of the oncoming vehicle, the illuminating body IB around the road, and saturation of the illuminating body IB of the oncoming vehicle and the illuminating body IB around the road.

In other words, it is possible to detect the reflection of the light caused by the illuminating body IB of the oncoming vehicle, the illuminating body IB around the road, and the saturation caused by the illuminating body IB of the oncoming vehicle and the illuminating body IB around the road.

Because it is possible to detect the illuminating body IB such as headlights of the oncoming vehicle and the illuminating body IB such as street lights around the road, it is possible to accurately determine a prediction region where the ghost distance is likely to occur, such as around the illuminating body IB, in addition to the pixel in which the saturation has occurred.

Given the circumstances, it is possible to execute a process of suppressing the occurrence of the ghost distance on the prediction region. This helps to suppress occurrence of the ghost distance due to lens glare despite any disturbance and obtain effective distance data.

In some embodiments, it is possible to implement the image processing apparatus 1 of the example embodiment of the disclosure by recording the process to be executed by the processor 100 on a non-transitory recording medium readable by a computer system, and causing the computer system to road the program recorded on the non-transitory recording medium onto the processor 100 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

As used herein, the term "collision" may be used interchangeably with the term "contact".

Each of the long-exposure distance image generator 110, the short-exposure distance image generator 120, the resolution reducer 130, the detector 140, the estimator 150, and the image processor 160 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the long-exposure distance image generator 110, the short-exposure distance image generator 120, the resolution reducer 130, the detector 140, the estimator 150, and the image processor 160. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the long-exposure distance image generator 110, the short-exposure distance image generator 120, the resolution reducer 130, the detector 140, the estimator 150, and the image processor 160 illustrated in FIG. 1.

The invention claimed is:

1. An image processing apparatus comprising:
a long-exposure distance image generator configured to calculate a parallax between a first long-exposure image derived from a first long-exposure camera and a second long-exposure image derived from a second long-exposure camera to generate a long-exposure distance image, the first long-exposure camera and the second long-exposure camera being disposed at a predetermined distance from each other and each configured to capture an image at long exposure;
a short-exposure distance image generator configured to calculate a parallax between a first short-exposure image derived from a first short-exposure camera and a second short-exposure image derived from a second short-exposure camera to generate a short-exposure distance image, the first short-exposure camera and the second short-exposure camera being disposed at a predetermined distance from each other and each configured to capture an image at short exposure;
a resolution reducer configured to reduce resolution of the long-exposure distance image and the short-exposure distance image by reducing, in the long-exposure distance image and the short-exposure distance image, number of pixels in pixel regions in which a surrounding area is captured that comprises an illuminating body of a second vehicle located in front of a first vehicle to which the image processing apparatus is to be applied;
a detector configured to perform a detection of a pixel region in which saturation has occurred among the pixel regions of the long-exposure distance image whose resolution has been reduced;
an estimator configured to estimate, based on a result of the detection performed by the detector, a moving distance of a specific object from a moving amount of the specific object in the pixel region in which the saturation has occurred within the long-exposure distance image whose resolution has been reduced; and
an image processor configured to, when a difference between the moving distance of the specific object that has been estimated and an actual moving distance of the first vehicle is within a predetermined threshold range, with regard to the pixel region in which the saturation has occurred in the long-exposure distance image, generate a distance image using distance data of the pixel region in which the saturation has occurred.

2. The image processing apparatus according to claim 1, wherein, with regard to an overlapping region between the pixel region in which the saturation has occurred in the long-exposure distance image and a pixel region in which the illuminating body of the second vehicle has been captured in the short-exposure distance image, the image processor is configured to generate the distance image using distance data of the pixel region in which the illuminating body of the second vehicle has been captured in the short-exposure distance image.

3. The image processing apparatus according to claim 2, wherein, with regard to a pixel region other than the pixel region in which the saturation has occurred in the long-exposure distance image, the image processor is configured to generate the distance image using distance data of the long-exposure distance image or the short-exposure distance image.

4. The image processing apparatus according to claim 1, wherein the image processor is configured to change the predetermined threshold range and the number of pixels to be reduced in accordance with a weather state.

5. The image processing apparatus according to claim 1, wherein, when the long-exposure distance image or the short-exposure distance image comprises reflection of light caused by an illuminating body of a third vehicle that travels in an opposite direction to a direction in which the first vehicle travels or an illuminating body around a road, the image processor is configured to generate the distance image using the long-exposure distance image or the short-exposure distance image including the saturation and excluding the reflection of the light.

6. An image processing method in an image processing apparatus comprising a long-exposure distance image generator, a short-exposure distance image generator, a resolution reducer, a detector, an estimator, and an image processor, the image processing method comprising:
  generating, with the long-exposure distance image generator, a long-exposure distance image by calculating a parallax between a first long-exposure image derived from a first long-exposure camera and a second long-exposure image derived from a second long-exposure camera, the first long-exposure camera and the second long-exposure camera being disposed at a predetermined distance from each other and each configured to capture an image at long exposure;
  generating, with the short-exposure distance image generator, a short-exposure distance image by calculating a parallax between a first short-exposure image derived from a first short-exposure camera and a second short-exposure image derived from a second short-exposure camera, the first short-exposure camera and the second short-exposure camera being disposed at a predetermined distance from each other and each configured to capture an image at short exposure;
  reducing resolution of the long-exposure distance image and the short-exposure distance image, with the resolution reducer, by reducing, in the long-exposure distance image and the short-exposure distance image, number of pixels in pixel regions in which a surrounding area is captured that comprises an illuminating body of a second vehicle located in front of a first vehicle to which the image processing apparatus is to be applied;
  performing, with the detector, a detection of a pixel region in which saturation has occurred among the pixel regions of the long-exposure distance image whose resolution has been reduced;
  estimating, with the estimator, based on a result of the detection performed by the detector, a moving distance of a specific object from a moving amount of the specific object in the pixel region in which the saturation has occurred within the long-exposure distance image whose resolution has been reduced; and
  generating, with the image processor, when a difference between the moving distance of the specific object that has been estimated and an actual moving distance of the first vehicle is within a predetermined threshold range, with regard to the pixel region in which the saturation has occurred in the long-exposure distance image, a distance image using distance data of the pixel region in which the saturation has occurred.

7. A non-transitory computer readable recording medium containing a program to be applied to an image processing apparatus comprising a long-exposure distance image generator, a short-exposure distance image generator, a resolution reducer, a detector, an estimator, and an image processor, the program causing, when executed by a computer, the computer to implement an image processing method, the image processing method comprising:
  generating, with the long-exposure distance image generator, a long-exposure distance image by calculating a parallax between a first long-exposure image derived from a first long-exposure camera and a second long-exposure image derived from a second long-exposure camera, the first long-exposure camera and the second long-exposure camera being disposed at a predetermined distance from each other and each configured to capture an image at long exposure;
  generating, with the short-exposure distance image generator, a short-exposure distance image by calculating a parallax between a first short-exposure image derived from a first short-exposure camera and a second short-exposure image derived from a second short-exposure camera, the first short-exposure camera and the second short-exposure camera being disposed at a predetermined distance from each other and each configured to capture an image at short exposure;
  reducing resolution of the long-exposure distance image and the short-exposure distance image, with the resolution reducer, by reducing, in the long-exposure distance image and the short-exposure distance image, number of pixels in pixel regions in which a surrounding area is captured that comprises an illuminating body of a second vehicle located in front of a first vehicle to which the image processing apparatus is to be applied;
  performing, with the detector, a detection of a pixel region in which saturation has occurred among the pixel regions of the long-exposure distance image whose resolution has been reduced;
  estimating, with the estimator, based on a result of the detection performed by the detector, a moving distance of a specific object from a moving amount of the specific object in the pixel region in which the saturation has occurred within the long-exposure distance image whose resolution has been reduced; and
  generating, with the image processor, when a difference between the moving distance of the specific object that has been estimated and an actual moving distance of the first vehicle is within a predetermined threshold range, with regard to the pixel region in which the saturation has occurred in the long-exposure distance image, a distance image using distance data of the pixel region in which the saturation has occurred.

8. An image processing apparatus comprising:
  one or more processors; and
  one or more memories communicably coupled to the one or more processors, wherein the one or more processors are configured to:
  generate a long-exposure distance image by calculating a parallax between a first long-exposure image derived from a first long-exposure camera and a second long-exposure image derived from a second long-exposure camera, the first long-exposure camera and the second long-exposure camera being disposed at a predetermined distance from each other and each configured to capture an image at long exposure;
  generate a short-exposure distance image by calculating a parallax between a first short-exposure image derived from a first short-exposure camera and a second short-exposure image derived from a second short-exposure camera, the first short-exposure camera and the second short-exposure camera being disposed at a predetermined distance from each other and each configured to capture an image at short exposure;
  reduce resolution of the long-exposure distance image and the short-exposure distance image by reducing, in the long-exposure distance image and the short-exposure distance image, number of pixels in pixel regions in which a surrounding area is captured that comprises an illuminating body of a second vehicle located in front of a first vehicle to which the image processing apparatus is to be applied;
  perform a detection of a pixel region in which saturation has occurred among the pixel regions of the long-exposure distance image whose resolution has been reduced;
  estimate, based on a result of the detection performed by the detector, a moving distance of a specific object from a moving amount of the specific object in the pixel region in which the saturation has occurred within the long-exposure distance image whose resolution has been reduced; and
  generate, when a difference between the moving distance of the specific object that has been estimated and an actual moving distance of the first vehicle is within a predetermined threshold range, with regard to the pixel region in which the saturation has occurred in the long-exposure distance image, a distance image using distance data of the pixel region in which the saturation has occurred.

* * * * *